(12) United States Patent
Bartel

(10) Patent No.: US 10,414,374 B1
(45) Date of Patent: Sep. 17, 2019

(54) LOCKABLE DEVICE FOR DISABLING A CONTROL LEVER

(71) Applicant: Excel Industries, Inc., Hesston, KS (US)

(72) Inventor: Harlan John Bartel, Newton, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 0 days.

(21) Appl. No.: 15/017,239

(22) Filed: Feb. 5, 2016

Related U.S. Application Data

(60) Provisional application No. 62/112,719, filed on Feb. 6, 2015.

(51) Int. Cl.
| | |
|---|---|
| *B60R 25/00* | (2013.01) |
| *E05B 79/10* | (2014.01) |
| *B60R 25/021* | (2013.01) |
| *E05B 79/02* | (2014.01) |
| *E05B 67/00* | (2006.01) |
| *B60R 25/08* | (2006.01) |
| *B60R 25/06* | (2006.01) |

(52) U.S. Cl.
CPC ...... *B60R 25/003* (2013.01); *B60R 25/02147* (2013.01); *B60R 25/06* (2013.01); *B60R 25/08* (2013.01); *E05B 67/00* (2013.01); *E05B 79/02* (2013.01); *E05B 79/10* (2013.01)

(58) Field of Classification Search
CPC .......... E05B 79/00; E05B 79/02; E05B 79/10; E05B 79/12; E05B 79/14; E05B 79/16; E05B 79/18; B60R 25/002; B60R 25/003; B60R 25/005; B60R 25/007; B60R 25/008; B60R 25/022; B60R 25/0221; B60R 25/0225; B60R 25/0228; B60R 25/06; B60R 25/066; B60R 25/08; B60R 25/086

See application file for complete search history.

(56) References Cited

U.S. PATENT DOCUMENTS

| | | | |
|---|---|---|---|
| 1,251,591 A | 1/1918 | Stoddart | |
| 1,291,617 A | 1/1919 | O'Leary | |
| 1,338,131 A | 4/1920 | Hedricks | |
| 1,443,262 A | 1/1923 | Hinrichs et al. | |
| 3,550,409 A * | 12/1970 | Pariser | B60R 25/0221 70/203 |

(Continued)

OTHER PUBLICATIONS

The Equipment Lock Company brochure; Oct. 2013.

*Primary Examiner* — Christopher J Boswell
(74) *Attorney, Agent, or Firm* — Robert O. Blinn

(57) ABSTRACT

A lockable device is arranged for blocking the control lever slot of a zero turn radius (ZTR) vehicle. In one embodiment, the lockable device includes a first portion and a second portion which adjust between a contracted position and an expanded position. The lockable device presents first and second projecting members which can be placed under the edges of a control lever slot of a ZTR vehicle. The lockable device may be contracted to be received by a ZTR control lever slot and then may be expanded so that the first and second projecting members of the lockable device are received under the edges of the control lever slot. The lockable device may also be integral within the vehicle. An integral lock or a padlock may be used to secure the lockable device in the expanded position in a control lever slot to prevent movement of a control lever.

6 Claims, 9 Drawing Sheets

(56) References Cited

U.S. PATENT DOCUMENTS

| | | | | |
|---|---|---|---|---|
| 3,690,131 | A * | 9/1972 | Davis | B60R 25/0221 |
| | | | | 70/203 |
| 4,030,323 | A | 6/1977 | Stanislawozyk | |
| 4,282,769 | A | 8/1981 | Sandrock | |
| 4,304,110 | A * | 12/1981 | Fain | B60R 25/0225 |
| | | | | 70/209 |
| 4,372,136 | A * | 2/1983 | Mickelson | E05B 83/10 |
| | | | | 292/288 |
| 4,474,085 | A | 10/1984 | DeVogelaere et al. | |
| 4,732,019 | A * | 3/1988 | Tolar | B60R 25/002 |
| | | | | 70/181 |
| 4,972,693 | A | 11/1990 | Inouye | |
| 5,082,213 | A * | 1/1992 | Torres | B64C 13/04 |
| | | | | 244/224 |
| 5,311,756 | A | 5/1994 | Milani | |
| 5,765,416 | A * | 6/1998 | Cote | B60R 25/005 |
| | | | | 292/339 |
| 5,953,941 | A * | 9/1999 | Freund | B60R 25/0221 |
| | | | | 180/90 |
| 6,240,753 | B1 * | 6/2001 | Wu | B60R 25/0225 |
| | | | | 70/209 |
| 6,718,842 | B1 | 4/2004 | Bofias | |
| 6,829,914 | B2 | 12/2004 | Bullock | |
| 7,681,421 | B2 * | 3/2010 | Cannon | E05C 19/003 |
| | | | | 200/43.14 |
| 9,248,805 | B2 * | 2/2016 | Pitts | A01D 34/82 |
| 2002/0104342 | A1 | 8/2002 | Witchey | |
| 2012/0317948 | A1 | 12/2012 | Abe et al. | |

* cited by examiner

LOCKABLE DEVICE FOR DISABLING A CONTROL LEVER

RELATED APPLICATIONS

This application claims the benefit of U.S. Provisional Patent Application No. 62/112,719 filed on Feb. 6, 2015 which is incorporated herein by reference.

FIELD

This invention relates to a lockable device for disabling a control lever of a zero turn radius (ZTR) vehicle.

BACKGROUND

The unauthorized use or theft of zero turn radius (ZTR) vehicles such as ZTR riding mowers is a recurring problem. What is needed is a device for preventing the unauthorized operation of a ZTR riding mower.

SUMMARY

The above stated need is addressed by a lockable device which is suitable for blocking a zero turn radius (ZTR) vehicle control lever. In one embodiment, the lockable device has a first portion and a second portion which are able to be adjusted with respect to each other between a contracted position and an expanded position. The first and second portions present first and second projecting members which may be suitable for being placed under respective opposite edges of a ZTR control lever slot. The lockable device can be contracted so that it can be received by a control lever slot. In one embodiment, after the lockable device is received by a control lever slot, the lockable device is able to be expanded to a securing position which is characterized by the first and second projecting members being received under the opposite edges of the control lever slot. The lockable device is able to be locked in the expanded securing position in order to secure the lockable device within the control lever slot. The lockable device is arranged so that when the lockable device is secured in the control lever slot, the control lever cannot be moved within the control lever slot sufficiently to control the ZTR vehicle. In one embodiment, the lockable device is able to receive a lock or is able to receive a shackle of a padlock in order to be locked in an expanded securing position. In other embodiments, the lockable device may include an integral lock.

DETAILED DESCRIPTION

Figure 1:
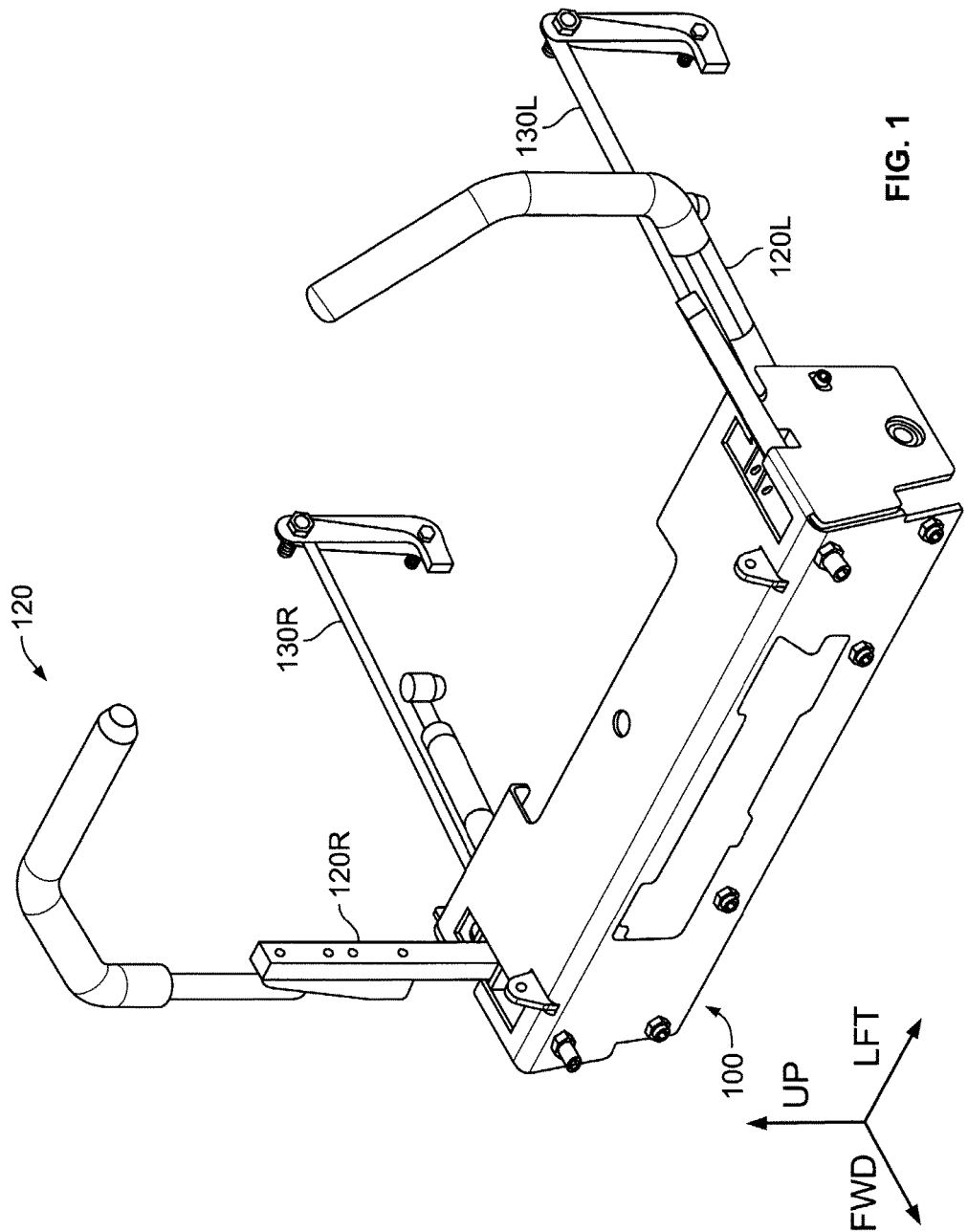
FIG. 1 is a perspective view of a portion of a ZTR vehicle frame showing right and left ZTR control levers.
Figure 2:
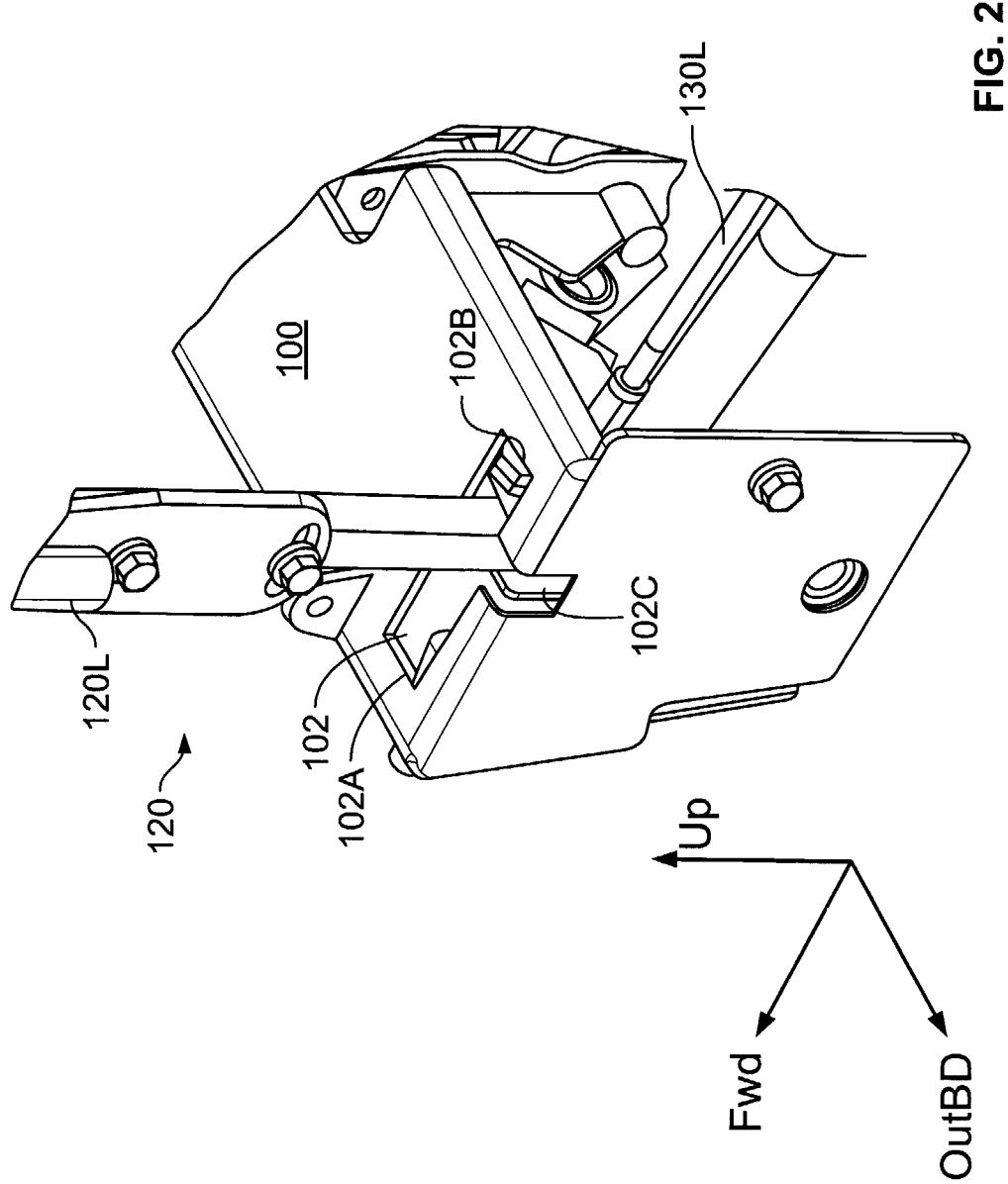
FIG. 2 is a perspective view of a portion of the left side of a ZTR vehicle frame showing a left control lever in a neutral inboard position.
Figure 3:
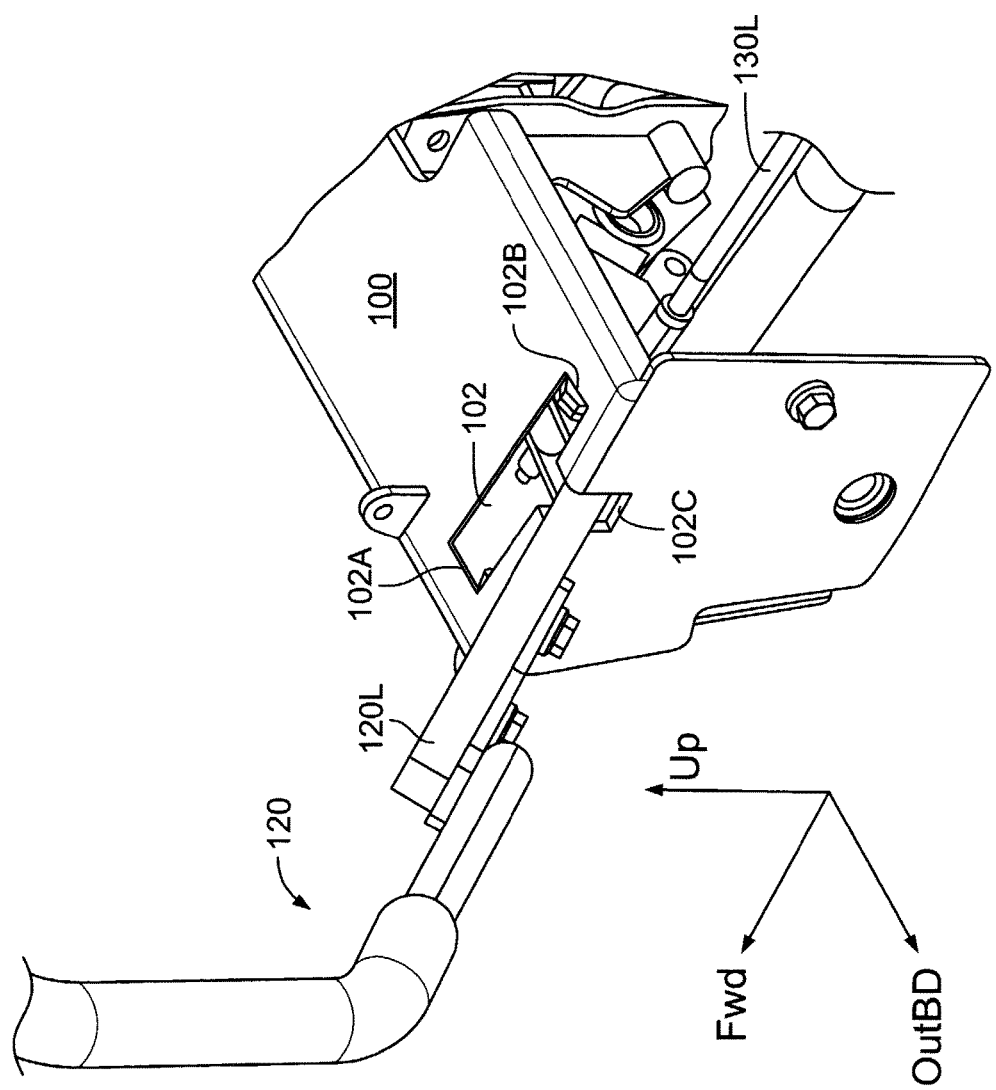
FIG. 3 is a perspective view of a portion of the left side of a ZTR vehicle frame showing a left control lever in a neutral outboard position with the control lever outside the control lever slot.

Referring to the drawings, FIGS. 1-3 illustrate a portion of a vehicle frame structure 100 and a control arrangement 120 including, in this example, right and left control levers 120R and 120L. Frame structure 100 and control lever arrangement 120 are taken from a typical zero turn radius (ZTR) vehicle such as, for example, a ZTR riding lawn mower. As can be seen FIG. 2, in which a close up perspective view of the left side of control lever arrangement 120 is provided, frame structure 100 presents a control lever slot 102 which, in this example, extends longitudinally between a first edge 102A and a second opposite edge 102B. In this example, control lever slot 102 is arranged to accommodate the forward and aft pivoting motion of control lever 120L. In this example, control lever 120L is connected to linkage 130L, which, in turn is connected to a hydraulic control device (not shown) associated with a left side hydraulic motor (not shown) which powers a left drive wheel (not shown).

Figure 4:
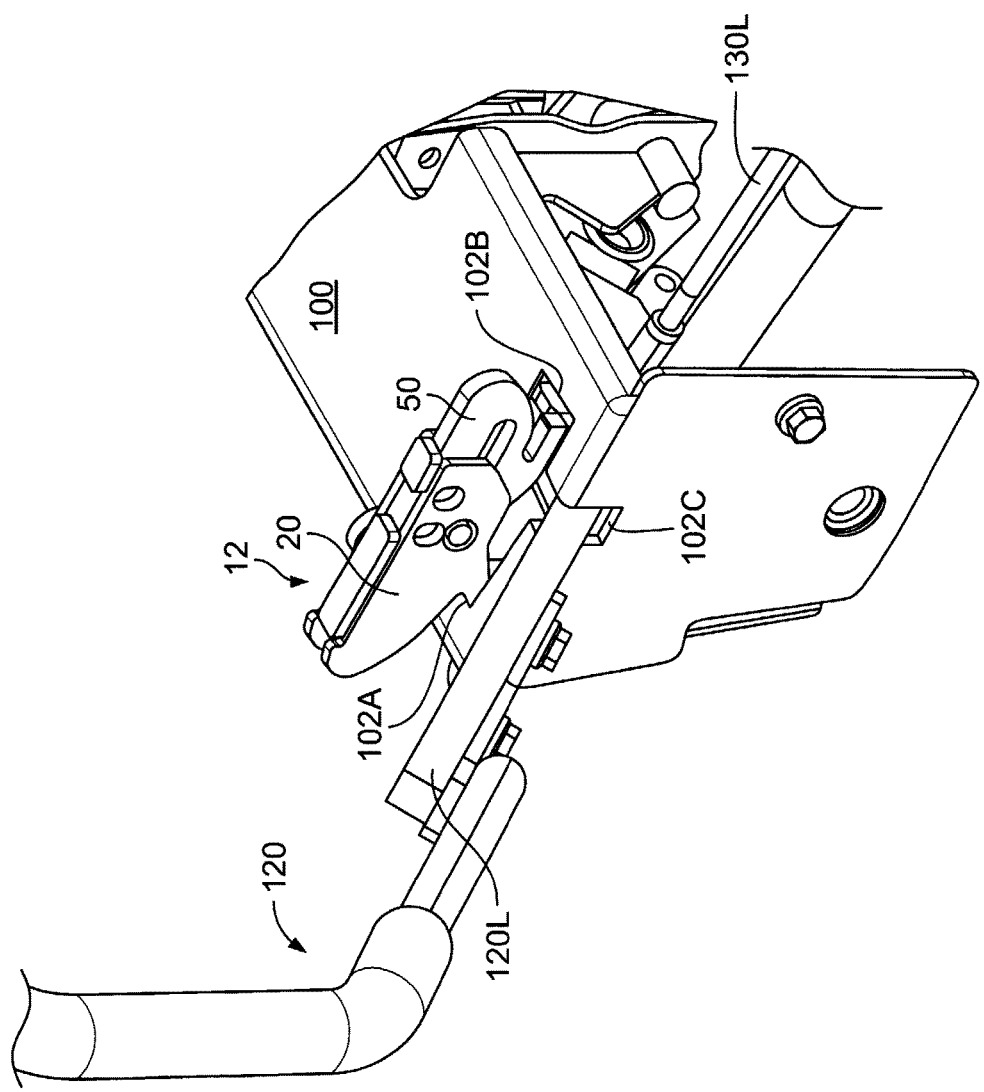
FIG. 4 is a perspective view of one embodiment of a lockable device shown prior to insertion into the control lever slot.

FIG. 2 shows control lever 120L in the neutral position. In this example, when control lever 120L in FIG. 2, is tilted from the neutral position toward edge 102A, the left hydraulic motor turns the left drive wheel in the forward direction. Conversely, in this example, when control lever 120L is tilted away from the neutral position toward edge 102B, the hydraulic motor turns the left drive wheel in reverse. As can be seen in FIGS. 2-4, a lateral slot 102C extends laterally from control lever slot 102. As is shown in FIGS. 2 and 3, it is possible to pivot lever 120L, when it is in the neutral position shown in FIG. 2, out of control lever slot 102 and into lateral slot 102C as is shown in FIG. 3. Lateral slot 102C is preferably located adjacent to the neutral position of control lever 120L such that when control lever 120L is in the neutral position shown in FIG. 2 or is tilted out into lateral slot 102C as shown in FIG. 3, the hydraulic motor does not turn the left drive wheel. Of course, this same arrangement is repeated symmetrically on the right side of the vehicle to provide control of the right drive wheel. However, the applicant, in this detailed description, will focus on the left side of the vehicle for simplicity and clarity.

FIGS. 4-8B illustrate one embodiment of a lockable device 10 which is suitable for blocking control lever slot 102 and thereby preventing the use of control lever 120L. The skilled reader will appreciate that if only one of control levers 120R and 120L is rendered inoperative, it will not be possible to operate the ZTR vehicle. In this example, lockable device 10 is installed when control lever 120L is pivoted outboard in lateral slot 102C thereby disabling control lever 120L. As can be best understood by referring to FIGS. 6 and 7A-7E, in this example, lockable device 10 may be used with a padlock 80.

As is shown in FIGS. 7A-7E and FIGS. 8A and 8B, lockable device 10 may further include a first portion 20 and a second portion 50. As can be seen in FIGS. 7A-7E, first and second portions 20 and 50 fit together and are able to slide relative to each other between an extended position shown in FIG. 7B and a contracted position shown in FIG. 7E. As can also be seen in FIG. 7A, first portion 20 presents a first notch 22 and second portion 50 presents a second notch 52. First notch 22 is defined by a projecting member 22F which extends outwardly over the body of first portion 20. Similarly, second notch 52 is also defined by a projecting member 52F which extends outwardly over the body of second portion 50. Although notches 22 and 52 are used in this embodiment to engage edges 102A and 102B, it is actually projecting members 22F and 52F which are received under edges 102A and 102B of control lever slot 102 in this embodiment. In this example, first and second portion 20 and 50 are fashioned from steel plate but any other suitable strong, tough material may be selected. The way in which first and second portions 20 and 50 fit together, extend and contract and are locked in a fixed position will be described in greater detail below.

Figure 7A:
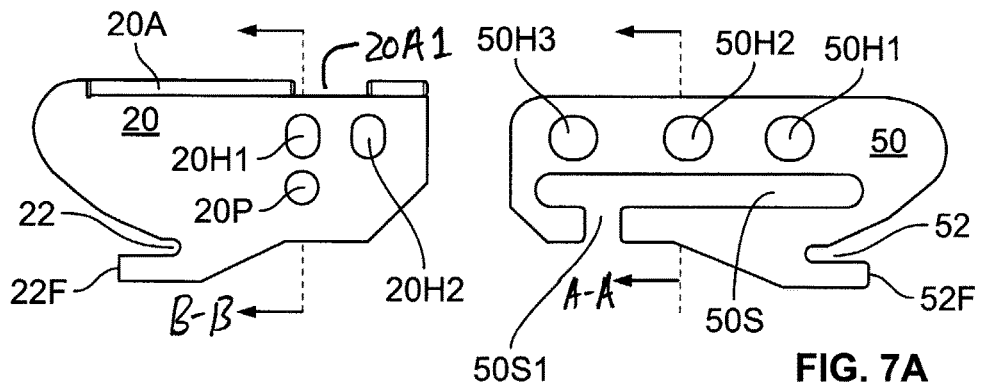
FIG. 7A is a plan view of one embodiment of the lockable device showing the first and second portions in a disassembled condition.
Figure 8A:
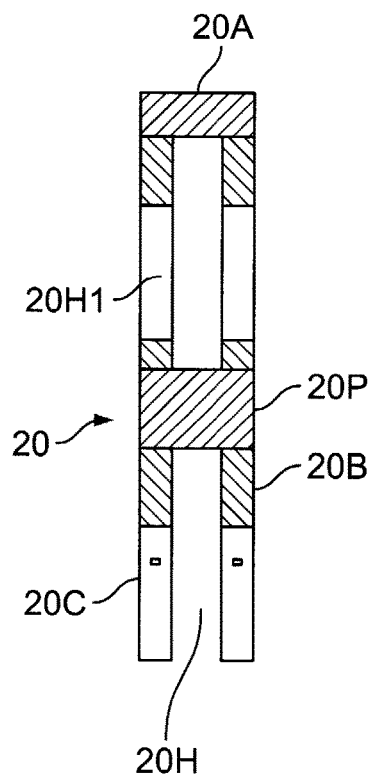
FIG. 8A is a cut away view of one embodiment of the first portion of the lockable device taken from plane A-A indicated in FIG. 7A.
Figure 8B:
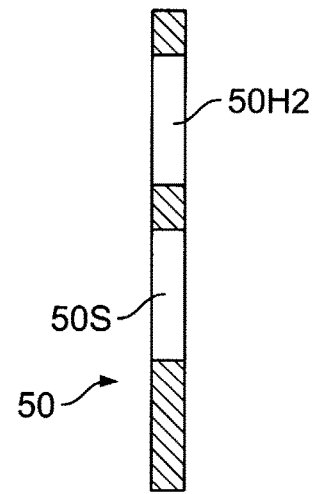
FIG. 8B is a cut away view of one embodiment of the second portion of the lockable device taken from plane B-B indicated in FIG. 7A.

The configurations of first and second portions 20 and 50 of lockable device 10 may be best understood by referring to FIGS. 7A, 8A and 8B. FIG. 8A provides a cross-section view of first portion 20 which is taken from plane A-A indicated in FIG. 7A. FIG. 8B provides a cross-section view of second portion 50 which is taken from plane B-B indicated in FIG. 7A. As can be seen in FIGS. 7A and 8A, first portion 20 is channel shaped having a cap 20A, a first side wall 20B and a second side will 20C which define a channel 20H. Cap 20A also presents a gap 20A1 the purpose of which will be explained below. A pin 20P extends across channel 20H between first and second side walls 20A and 20B. Pin 20P is fixed to side walls 20A and 20B either by welding or force fitting or any other suitable process that will fix pin 20P. The purpose of pin 20P will also be explained below. Two locking holes 20H1 and 20H2 extend through first and second side walls 20B and 20C. In this example, locking holes 20H1 and 20H2 are slightly elongated in the vertical direction and are spaced apart in a longitudinal direction and located adjacent to the end of first portion 20 that is opposite notch 22.

Second portion 50 of lockable device 10, in this example, is also fashioned from steel plate. As noted above, second portion 50 presents second notch 52. Second portion 50 also presents an assembly slot 50S which extends most of the length of second portion 50 and which also has, in this example, an inlet 50S1 connecting between the perimeter of second portion 50 and assembly slot 50S. Second portion 50 also presents a pattern of locking holes 50H1, 50H2 and 50H3 which are distributed in a staggered fashion under between assembly slot 50S and the lower edge of second portion 50.

Figure 7B:
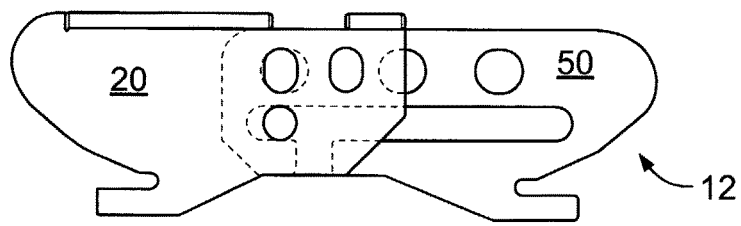
FIG. 7B is a plan view of one embodiment of the lockable device showing the first and second portions almost fully expanded.

First portion 20 and second portion 50 can be assembled as shown in FIG. 7B by inserting second portion 50 into channel 20H of first portion 20 while also guiding pin 20P into inlet 50S1 of assembly slot 50S of second portion 50. Gap 20A1 in cap 20A of first portion 20 provides clearance for the corner 50C of second portion 50 which is diagonally opposite second notch 52 of second portion 50 when pin 20P is being guided into assembly slot 50S. Once pin 20P is located within assembly slot 50S, it is possible to slide second portion 50 within first portion 20 between the expanded position shown in FIG. 7B and the contracted position shown in FIG. 7E.

Figure 7C:
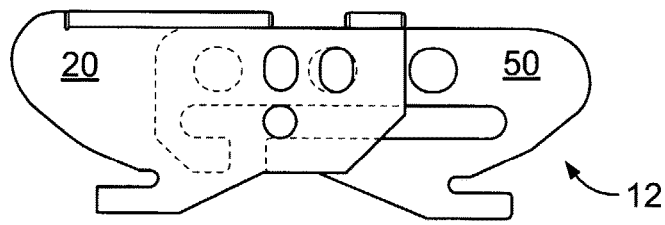
FIG. 7C is a plan view of one embodiment of the lockable device showing the first and second portions expanded to a lesser degree than is shown in FIG. 7B.
Figure 7D:
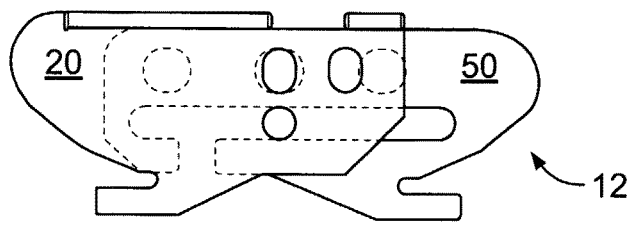
FIG. 7D is a plan view of one embodiment of the lockable device showing the first and second portions expanded to a lesser degree than is shown in FIG. 7C.

As can be seen by inspecting FIGS. 7B-7E, it is possible to secure first and second portions 20 and 50 of lockable device 10 in one of four selected positions for varying degrees of expansion and contraction. In FIG. 7B, locking hole 20H1 of first portion 20 is aligned with locking hole 50H3 of second portion 50. If the shackle of a padlock is received by locking holes 20H1 and 50H3, lockable device 10 will be secured with the maximum degree of expansion (for a locked and secured configuration) shown in FIG. 7B. In FIG. 7C, locking hole 20H2 of first portion 20 is aligned with locking hole 50H2 of second portion 50. If the shackle of a padlock is received by locking holes 20H2 and 50H2, lockable device 10 will be secured with the degree of expansion shown in FIG. 7C. In FIG. 7D, locking hole 20H1 of first portion 20 is aligned with locking hole 50H2 of second portion 50. If the shackle of a padlock is received by locking holes 20H1 and 50H2, lockable device 10 will be secured with the degree of expansion shown in FIG. 7D. Finally, in FIG. 7E, locking hole 20H2 of first portion 20 is aligned with locking hole 50H1 of second portion 50. If the shackle of a padlock is received by locking holes 20H2 and 50H1, lockable device 10 will be secured with the minimum degree of expansion shown in FIG. 7E. As can be seen by the position of pin 20P in slot 50S in FIG. 7E, if the shackle of a padlock is not present locking holes 20H2 and 50H1, first and second portions 20 and 50 are able to slide together further to bring projecting portions 22F and 50F in closer proximity than shown in FIG. 7E so that lockable device 10 may be received by a relatively short control lever slot. As can be understood by considering the above, locking holes 20H1 and 20H2 of first portion 20 and locking holes 50H1, 50H2 and 50H3 of second portion 50 are staggered in such a manner that it is possible to secure lockable device 10 in one of the four positions shown in FIGS. 7B-7E. In one embodiment, projecting members 22F and 52F preferably are of sufficient length such that when a suitable one of the positions shown in FIGS. 7B-7E is selected for securing lockable device 10 within a control lever slot of a ZTR vehicle, projecting members 22F and 52F have sufficient length to extend under the opposite edges of a control lever slot. In other embodiments, projecting members may extend into the control lever slot to block the path of the control lever and therefore may not need to extend under the opposite edges of a control lever slot.

Figure 5:
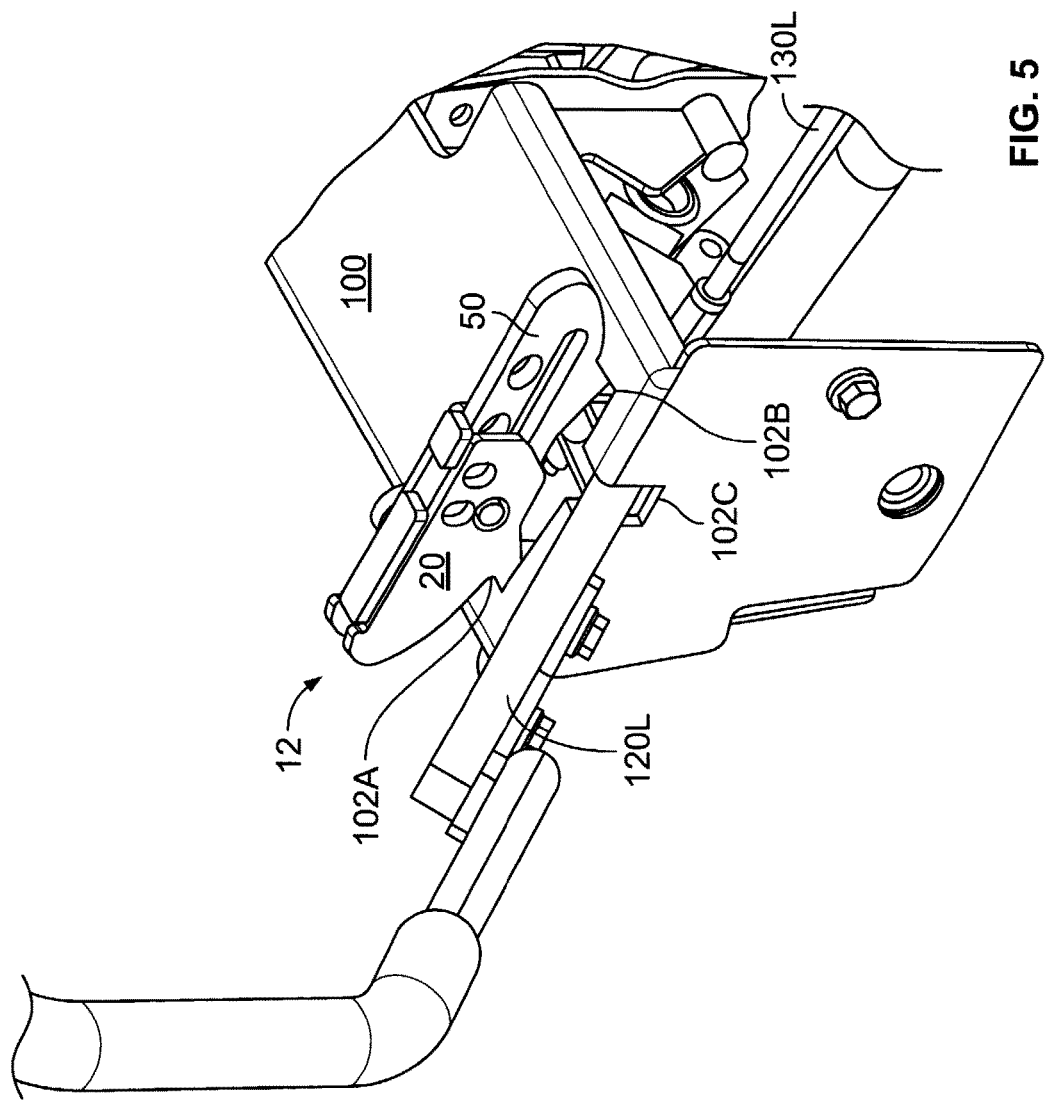
FIG. 5 is a perspective view of a one embodiment of the lockable device in the expanded position and shown with the first and second projecting members of the first and second portions received under opposite edges of the control lever slot of a ZTR vehicle.
Figure 6:
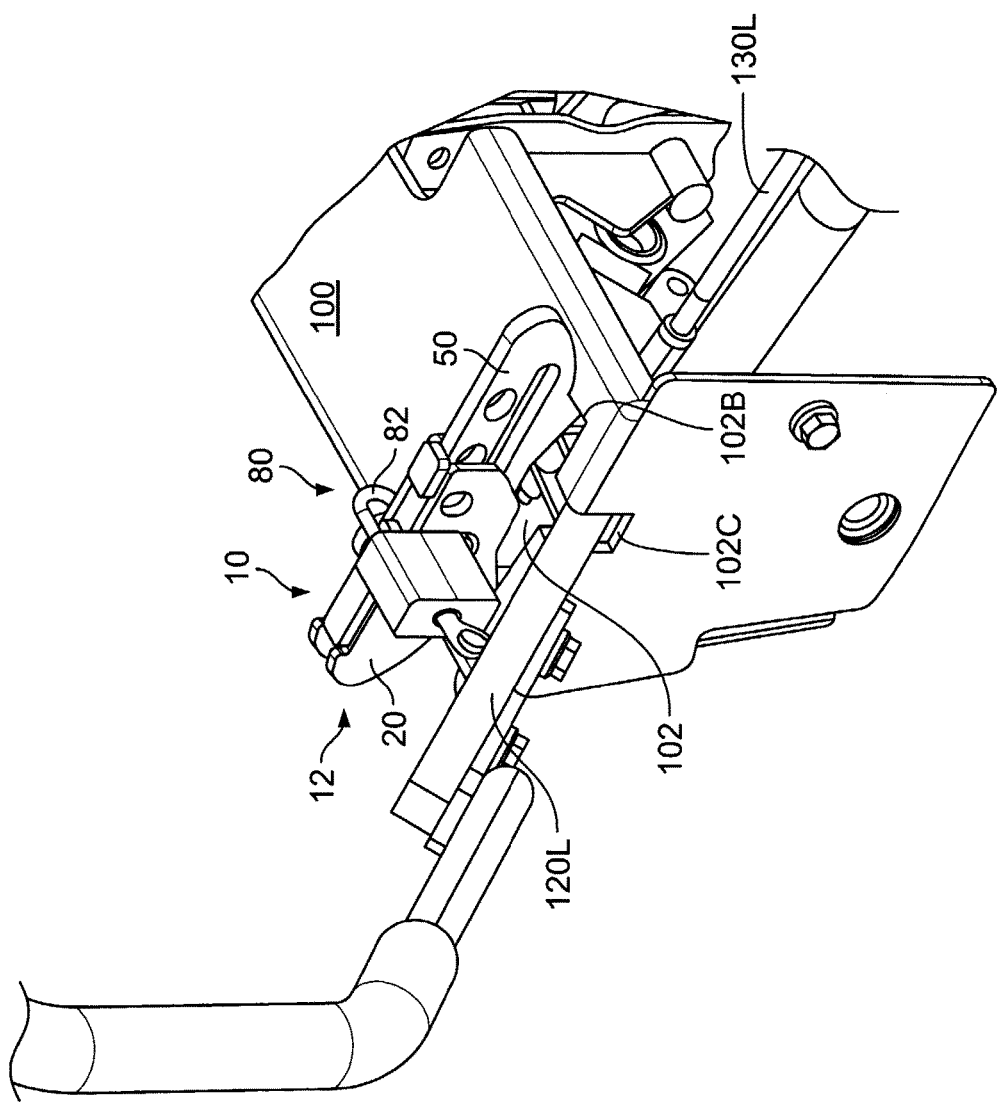
FIG. 6 is a perspective view of a one embodiment of the lockable device in the expanded position shown with the first and second projecting members of the first and second portions received under opposite edges of the control lever slot of a ZTR vehicle and with the lockable device also being shown with a padlock installed for securing the lockable device in its expanded position.
Figure 7E:
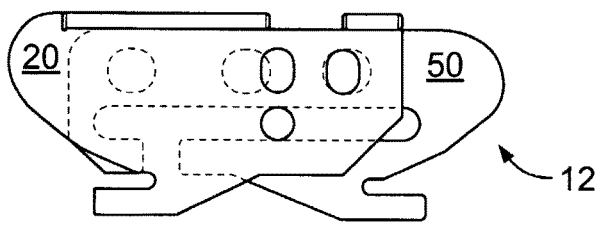
FIG. 7E is a plan view of one embodiment of the lockable device showing the first and second portions contracted to a length that is less than the length of the lockable device as shown in FIG. 7D.

FIGS. 4-6 show how lockable device 10 can be secured in control lever slot 102 to block control lever slot from unauthorized use of control lever 120L. In FIG. 4, control lever 120L is pivoted outboard into lateral slot 102C and lockable device 10 is contracted sufficiently generally as shown in FIG. 7E so that the distal ends of projecting members 22F and 52F of first and second portions 20 and 50 respectively are able to be received between first and second end edges 102A and 102B of control lever slot 102. Once lockable device 12 has been lowered into control lever slot 102, lockable device 10 is able to be expanded as shown in FIG. 5 to one of the positions shown in FIGS. 7B-7E until first and second notches 22 and 52 each receive one of edges 102A and 102B of control lever slot 102. This position may be referred to as an expanded securing position. It is also contemplated that lockable device 10 may alternatively be constructed of portions that expand when an internal lock and key is activated to cause notches or projecting members to protrude from the lockable device until they engage or are received by edges of a control lever slot. In FIG. 6, lockable device 10 has been expanded to the position shown in FIGS. 6 and 7B and a shackle 82 of a padlock 80 has been inserted through locking hole 20H1 of first portion 20 and locking hole 50H3 of second portion 50 to secure lockable device 10 in the position shown in FIGS. 6 and 7B. With lock 80 secured and locked, control lever 120L is not free to move within control lever slot 102 to drive the ZTR vehicle. Lockable device 10 may be removed by unlocking and removing lock 80, contracting lockable device 10 and lifting lockable device 10 from control lever slot 102.

As can be seen from the above description, an operator is able to use lockable device 10 to block the movement of a control lever within a control lever slot. In the case of a ZTR mower, it is not possible to drive such a disabled ZTR mower up onto a trailer or truck for the purpose of transporting the mower. Would be thieves would therefore be greatly hindered in their efforts to transport and steal a ZTR riding mower.

Figure 9:
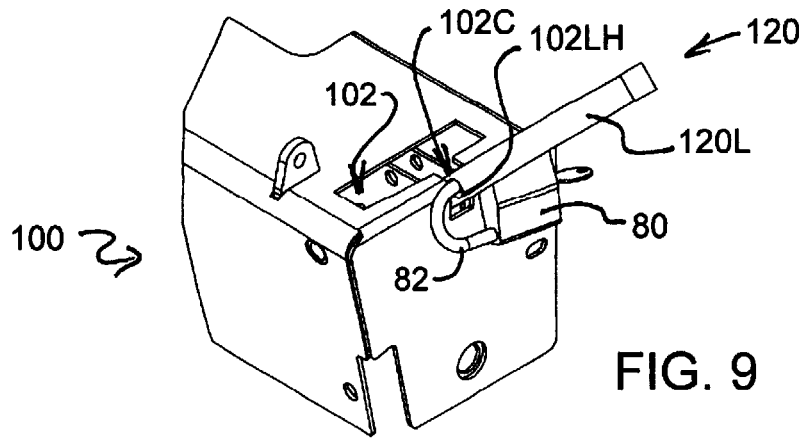
FIG. 9 is a perspective view of a first embodiment of an alternative locking device for disabling a control lever of a zero turn radius (ZTR) vehicle.
Figure 10:
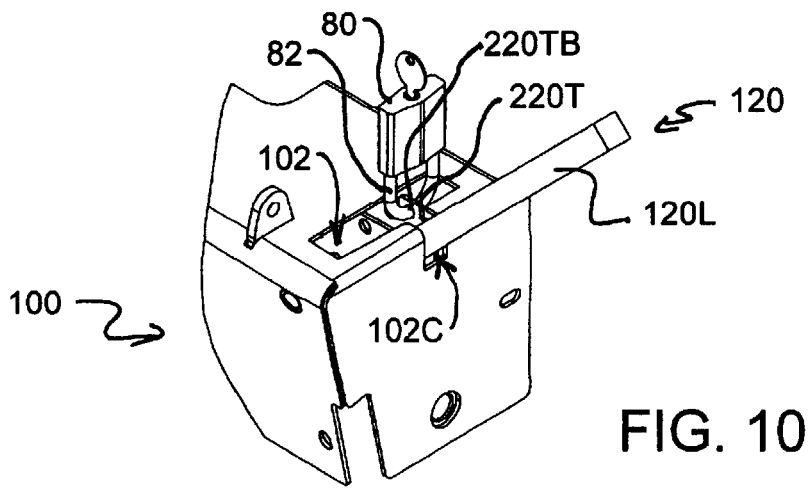
FIG. 10 is a perspective view of a second embodiment of an alternative locking device for disabling a control lever of a zero turn radius (ZTR) vehicle.
Figure 11:
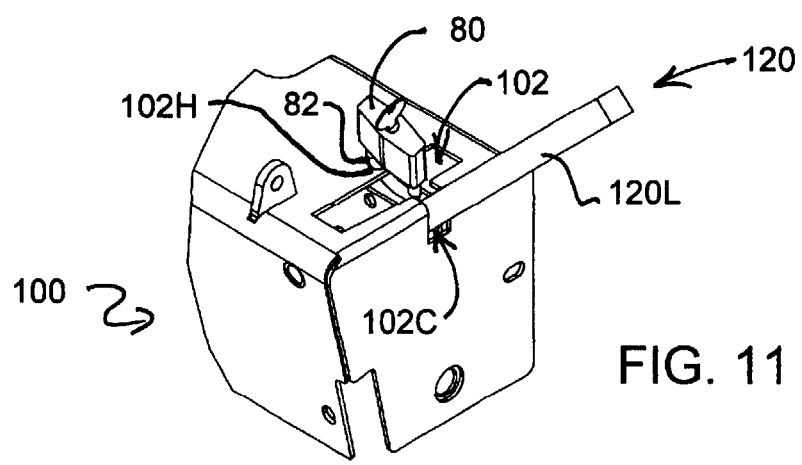
FIG. 11 is a perspective view of a third embodiment of an alternative locking device for disabling a control lever of a zero turn radius (ZTR) vehicle.

As noted above, all that is required to disable a ZTR mower is to prevent at least one control lever 120L from being able to move from a lateral slot 102C into a control lever slot 102, thereby preventing the movement of a control lever 120L within its corresponding control lever slot 102. The above described lockable device 10 may be used to prevent the movement of control lever 120L from lateral slot 102C into control lever slot 102 by obstructing control lever slot 102. In one embodiment, locking device 10 accomplishes this without making any physical alteration to mower frame structure 100 or control arrangement 120 or any portion of the mower. Such embodiments may allow for the retrofitting of machines that which lack built-in locking mechanisms. Other embodiments may be incorporated within machines as they are designed and manufactured. FIGS. 9-11 illustrate three example embodiments wherein physical alterations to either frame structure 100 or control arrangement 120 allow an operator to secure a padlock to either frame structure 100 or to control arrangement 120 so that control lever slot 102 is obstructed and such that it is not possible to move control lever 120L from a lateral slot 102C for controlling movement within a lever slot 102.

FIG. 9 illustrates a first embodiment wherein a control lever 120L presents a longitudinal hole 120LH which is suitable for receiving shackle 82 of padlock 80. As can be seen in FIG. 9, hole 120LH is located such that when shackle 82 of padlock 80 is received by hole 120LH and padlock 80 is locked, it is not possible to rotate control lever 120L from lateral slot 102C into control lever slot 102. Padlock 80, when secured interferes with the outboard wall of frame structure 120 and thereby prevents the rotation of control lever 120L out of lateral slot 102C. With padlock 80 secured as shown in FIG. 9, it is not possible to manipulate control lever 120L.

FIG. 10 illustrates a second embodiment wherein a tab 220T has been added to a portion of control arrangement 120. Tab 220T is situated to be in close proximity to control lever 120L when control lever 120L is in control lever slot 102. Tab 220T presents a hole 220TB which is suitable for receiving shackle 82 of padlock 80. When padlock 80 is secured to tab 220T as shown in FIG. 10, it becomes impossible or at least very difficult to rotate control lever 120L from lateral slot 102C into control lever slot 102 thereby disabling control lever 120L. While tab 220T does not interfere with the motion of control lever 120L, a padlock secured to tab 220T as shown in FIG. 10 will interfere with and prevent the movement of control lever 120L from lateral slot 102C into control lever slot 102. With padlock 80 secured to tab 220T, it becomes impossible or at least very difficult to use control lever 120L and therefore curbs unauthorized operating of the mower.

FIG. 11 illustrates a third embodiment wherein the inboard edge of control lever slot 102 opposite lateral slot 102C presents a hole 102H which is suitable for receiving shackle 82 of padlock 80. Hole 102H is preferably located opposite lateral slot 102C. Accordingly, when padlock 80 is secured in hole 102H as shown in FIG. 11, padlock 80 obstructs control lever slot 102 so that it is not possible or at least very difficult to rotate control lever 120L out of lateral slot 102C and into control lever slot 102. This disables control lever 120L and renders the unauthorized use of the mower nearly impossible.

As can be seen by referring to FIGS. 9-11, by making relatively minor modifications to frame 100 of a ZTR riding mower, or by making relatively minor modifications to control arrangement 120 of such a riding mower, it is possible to provide a way to secure a padlock to ZTR mower in order to prevent the unauthorized operation of the mower.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for disabling a zero turn radius lawn mower to prevent the unauthorized operation of the zero turn radius lawn mower, comprising the following steps:
   (a) obtaining a zero turn radius mower having a frame and two opposite control levers and corresponding control lever slots defined in the frame such that each control lever is able to be manually moved within each corresponding control lever slot for operating the mower, each control lever slot also presenting forward and rear opposite edges,
   (b) obtaining at least one lockable device that includes a first portion presenting a first projecting member and a second portion presenting a second projecting member and such that the first and second portions are adjustable with respect to each other between a first contracted position and a second expanded position, the lockable device further including a lock, (c) placing the at least one lockable device in the first contracted position and inserting the at least one lockable device into at least one of the control lever slots, (d) expanding the at least one lockable device toward the second expanded position until the first and second projecting members project past the opposite forward and back edges of the at least one control lever slot, (e) locking the lockable device with the lock in the expanded position of step (d) such that the at least one control lever slot is obstructed to prevent movement of the control lever within the at least one control lever slot thereby preventing the unauthorized operation of the mower.

2. The method of claim 1, wherein:
the first and second portions of the lockable device have corresponding holes suitable for receiving the shackle of a padlock, the corresponding holes of the first and second portions of the lockable device arranged such that at least one hole in the first portion aligns with at least one hole of the second portion when the first and second portions are in at least one expanded securing position.

3. The method of claim 2, wherein:
the corresponding holes of the first and second portions of the lockable device are arranged such that at least one hole in the first portion aligns with at least one hole of the second portion when the first and second portions are in one of a plurality of positions within the range of adjustment between a contracted position and an expanded position so that the aligned holes in the first and second portions are able to receive the shackle of a padlock whereby the lockable device is able to be secured in a plurality of expanded securing positions.

4. The method of claim 1, wherein:
one of the first portion and the second portion of the lockable device slidably receives the other of the first portion and the second portion of the lockable device.

5. The method of claim 1, wherein:
one of the first portion and second portion of the lockable device presents a channel and the other of the first portion and second portion presents a flange that is received by the channel of the other portion.

6. The method of claim 5, wherein:
a pin extends between the walls of the channel of the portion of the lockable device having a channel and the other portion includes a slot arranged to receive the pin such that the first and second portions are mated together and capable of extending and contracting movement as the pin moves within the slot.

\* \* \* \* \*